United States Patent
Morozov et al.

(10) Patent No.: US 9,094,990 B2
(45) Date of Patent: Jul. 28, 2015

(54) DEVICE, SYSTEM AND METHOD OF MULTI-USER MULTI-INPUT-MULTI-OUTPUT WIRELESS COMMUNICATION

(75) Inventors: Gregory Morozov, Nizhny Novgorod (RU); Alexander Maltsev, Nizhny Novgorod (RU); Alexei Davydov, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 65 days.

(21) Appl. No.: 13/820,552

(22) PCT Filed: Sep. 24, 2010

(86) PCT No.: PCT/RU2010/000531
§ 371 (c)(1),
(2), (4) Date: Mar. 4, 2013

(87) PCT Pub. No.: WO2012/039640
PCT Pub. Date: Mar. 29, 2012

(65) Prior Publication Data
US 2013/0163554 A1    Jun. 27, 2013

(51) Int. Cl.
*H04W 72/08*    (2009.01)
*H04B 7/04*    (2006.01)
(Continued)

(52) U.S. Cl.
CPC .......... *H04W 72/085* (2013.01); *H04B 7/0417* (2013.01); *H04B 7/0452* (2013.01);
(Continued)

(58) Field of Classification Search
CPC .. H04B 7/0452; H04B 7/0417; H04B 7/0639; H04B 7/0456; H04B 7/0634; H04B 7/0617; H04B 7/0689; H04B 7/0413; H04B 17/005

USPC .................. 370/342, 340, 208, 251, 336, 329
See application file for complete search history.

(56) References Cited

U.S. PATENT DOCUMENTS

2006/0203708 A1    9/2006    Sampath et al.
2006/0203891 A1*   9/2006    Sampath et al. .............. 375/132
(Continued)

FOREIGN PATENT DOCUMENTS

CN    101185259    5/2008
JP    2008536387    9/2008
(Continued)

OTHER PUBLICATIONS

International Search Report and Written Opinion for PCT application PCT/RU2010/000531 mailed on Jun. 20, 2011; 15 pages.
(Continued)

*Primary Examiner* — Charles C Jiang
*Assistant Examiner* — Will Lin
(74) *Attorney, Agent, or Firm* — Shichrur & Co.

(57) ABSTRACT

Device, system, and method of multi-user multi-input-multi-output (MIMO) wireless communication. In some embodiments, a wireless communication device (102) may be capable of receiving a plurality of channel feedback transmissions from a plurality of user devices (104, 106, 108) respectively, wherein a channel feedback transmission from a user device of the user devices includes partial information relating to a MIMO channel matrix between the wireless communication unit and the user device; and transmitting a multi-user MIMO transmission to the plurality of user devices according to a MIMO beamforming scheme, wherein the MIMO beamforming scheme is based on the plurality of channel feedback transmissions.

26 Claims, 4 Drawing Sheets

(51) Int. Cl.
  *H04B 7/216* (2006.01)
  *H04B 7/06* (2006.01)
(52) U.S. Cl.
  CPC ............. *H04B7/0434* (2013.01); *H04B 7/0478* (2013.01); *H04B 7/0617* (2013.01); *H04B 7/0632* (2013.01); *H04B 7/0634* (2013.01); *H04B 7/0639* (2013.01)

(56) References Cited

U.S. PATENT DOCUMENTS

| | | | |
|---|---|---|---|
| 2007/0155336 A1* | 7/2007 | Nam et al. | 455/69 |
| 2007/0183529 A1* | 8/2007 | Tujkovic et al. | 375/267 |
| 2009/0262719 A1* | 10/2009 | Shim et al. | 370/342 |
| 2009/0323849 A1* | 12/2009 | Bala et al. | 375/267 |
| 2010/0260234 A1* | 10/2010 | Thomas et al. | 375/141 |
| 2011/0200081 A1* | 8/2011 | Guo et al. | 375/224 |
| 2012/0051408 A1* | 3/2012 | Van Zelst et al. | 375/219 |
| 2012/0082256 A1* | 4/2012 | Gaur et al. | 375/260 |

FOREIGN PATENT DOCUMENTS

| | | |
|---|---|---|
| WO | 2009/047739 A2 | 4/2009 |
| WO | 2010042235 | 4/2010 |
| WO | 2010102583 | 9/2010 |

OTHER PUBLICATIONS

International Preliminary Report on Patentability of International PCT Application No. PCT/RU2010/000531, mailed on Mar. 26, 2013; 9 pages.

IEEE Standard for Information technology—Telecommunications and information exchange between systems—Local and metropolitan area networks—Specific requirements Part 11: Wireless LAN Medium Access Control (MAC) and Physical Layer (PHY) Specifications. IEEE Std 802.11™-2007 (Revision of IEEE Std 802.11-1999).

IEEE Standard for Local and metropolitan area networks Part 16: Air Interface for Broadband Wireless Access Systems IEEE IEEE Computer Society and the IEEE Microwave Theory and Techniques Society Sponsored by the LAN/MAN Standards Committee. IEEE Std 802.16™-2009 (Revision of IEEE Std 802.16-2004).

IEEE Transactions on Signal Processing, vol. 52, No. 2, Zero-Forcing Methods for Downlink Spatial Multiplexing in Multiuser MIMO Channels, Quentin H. Spencer, Student Member, IEEE, A. Lee Swindlehurst, Senior Member, IEEE, and Martin Haardt, Senior Member, IEEE. Feb. 2004.

IEEE Transactions on Wireless Communications, vol. 7, No. 3, Generalized Design of Multi-User MIMO Precoding Matrices Veljko Stankovic and Martin Haardt, Senior Member, IEEE. Mar. 2008.

IEEE Transactions on Information Theory, Vol. 51, No. 8, Limited Feedback Unitary Precoding for Spatial Multiplexing Systems David J. Love, Member IEEE, and Robert W. Heath, Jr., Member IEEE. Aug. 2005.

Radiophysics and Quantum Electronics, vol. 51, No. 9, Method for Efficient Representation of the Information on the Weighting Coefficients of a Transmitting Beamformer in Wireless Digital Communication Systems With Multielement Adaptive Antennas A. A.Mal'Tsev, S.A. Tiraspol'Sky, and A. V. Chervyakov. Sep. 2008.

IEEE P802.11 Wireless LANs TGac Channel Model Addendum. Mar. 2010.

Office Action for Japanese Patent Application No. 2013529097, mailed on Jan. 21, 2014, 4 pages, including 2 pages of English translation.

Shonei Kato et al., Imperfect Block Diagonalization for Downlink Multiuser MIMO Systems, the Institute of Electronics, Information and Communication Engineers Technical Report, Feb. 27, 2008, vol. 107, No. 518, 8 pages.

Tomoki Sada et al., Imperfect Block Diagonalization with Eigenvector Selection for Multiuser MIMO Downlink, Proceedings of the Institute of Electronics, Information and Communication Engineers General Conference 2010, Mar. 2, 2010, Communication 1,Mar. 2010, 3 pages.

Office Action for Korean Patent Application No. 10-2013-7007174, mailed on Feb. 14, 2014, 9 pages, including 5 pages of English translation.

Office Action for Korean Patent Application No. 10-2013-7007174, mailed on May 19, 2014, 6 pages, including 3 pages of English translation.

Office Action for Japanese Patent Application No. 2013-529097, mailed on Jun. 17, 2014, 4 pages, including 2 pages of English translation.

Office Action for Chinese Patent Application No. 201080069228.6, mailed on Dec. 31, 2014, 31 pages, including 22 pages Of English translation.

\* cited by examiner

DEVICE, SYSTEM AND METHOD OF MULTI-USER MULTI-INPUT-MULTI-OUTPUT WIRELESS COMMUNICATION

BACKGROUND

A wireless communication system may implement a Multi-User (MU) Multi-Input-Multi-Output (MIMO) scheme.

The multi-user MIMO scheme is considered as an effective way to achieve high throughput performance in wireless communication systems.

A wireless communication device ("station") may utilize a plurality of transmit antennas to simultaneously transmit MIMO transmissions to a plurality of wireless communication devices ("users"), each utilizing a plurality of receive antennas; and/or a plurality of receive antennas to simultaneously receive MIMO transmissions from the plurality of users.

An adaptive beamforming algorithm, e.g., a Block Diagonalization (BD) beamforming algorithm or a Regularized Block Diagonalization (RBD) beamforming algorithm, may be utilized at the station to support more than one spatial stream per user of the multi-user MIMO transmission.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Some embodiments may be used in conjunction with various devices and systems, for example, a video device, an audio device, an audio-video (A/V) device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a display, a flat panel display, a Personal Media Player (PMP), a digital video camera (DVC), a digital audio player, a speaker, an audio receiver, an audio amplifier, a data source, a data sink, a Digital Still camera (DSC), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a wired or wireless network, a wireless area network, a Wireless Video Area Network (WVAN), a Local Area Network (LAN), a Wireless LAN (WLAN), a Personal Area Network (PAN), a Wireless PAN (WPAN), devices and/or networks operating in accordance with existing WirelessHD™ and/or Wireless-Gigabit-Alliance (WGA) specifications and/or future versions and/or derivatives thereof, devices and/or networks operating in accordance with existing IEEE 802.11 (*IEEE 802.11-1999. Wireless LAN Medium Access Control (MAC) and Physical Layer (PHY) Specifications*), IEEE 802.11n, IEEE802.11 task group ac (TGac) ("*IEEE802.11-09/0308r12—TGac Channel Model Addendum Document*"), IEEE 802.11 task group ad (TGad), IEEE 802.16 (*IEEE-Std 802.16, 2009 Edition, Air Interface for Fixed Broadband Wireless Access Systems*), IEEE 802.16e (*IEEE-Std 802.16e, 2005 Edition, Physical and Medium Access Control Layers for Combined Fixed and Mobile Operation in Licensed Bands*), IEEE 802.16m (*amendment to IEEE Std 802.16-2009, developed by Task Group m*) standards and/or future versions and/or derivatives thereof, devices and/or networks operating in accordance with existing 3rd Generation Partnership Project (3GPP), 3GPP Long term Evolution (LTE), e.g., the 3GPP LTE Rel-8, and/or any other suitable protocol or standard, units and/or devices which are part of the above networks, one way and/or two-way radio communication systems, cellular radio-telephone communication systems, Wireless-Display (WiDi) device, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a MIMO transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, Enhanced Data rates for GSM Evolution (EDGE), 3GPP, 3GPP LTE, or the like. Other embodiments may be used in various other devices, systems and/or networks.

The term "wireless device" as used herein includes, for example, a device capable of wireless communication, a communication device capable of wireless communication, a communication station capable of wireless communication, a portable or non-portable device capable of wireless communication, or the like. In some embodiments, a wireless device may be or may include a peripheral that is integrated with a computer, or a peripheral that is attached to a computer. In some embodiments, the term "wireless device" may optionally include a wireless service.

Some embodiments may be implemented for wireless transmission of suitable content between two or more devices. In one embodiment, the content may include media content, for example, audio and/or video content, e.g., High Definition Television (HDTV) content, and the like. In other embodiments, the content may include any other suitable data, information and/or signals.

Figure 1:
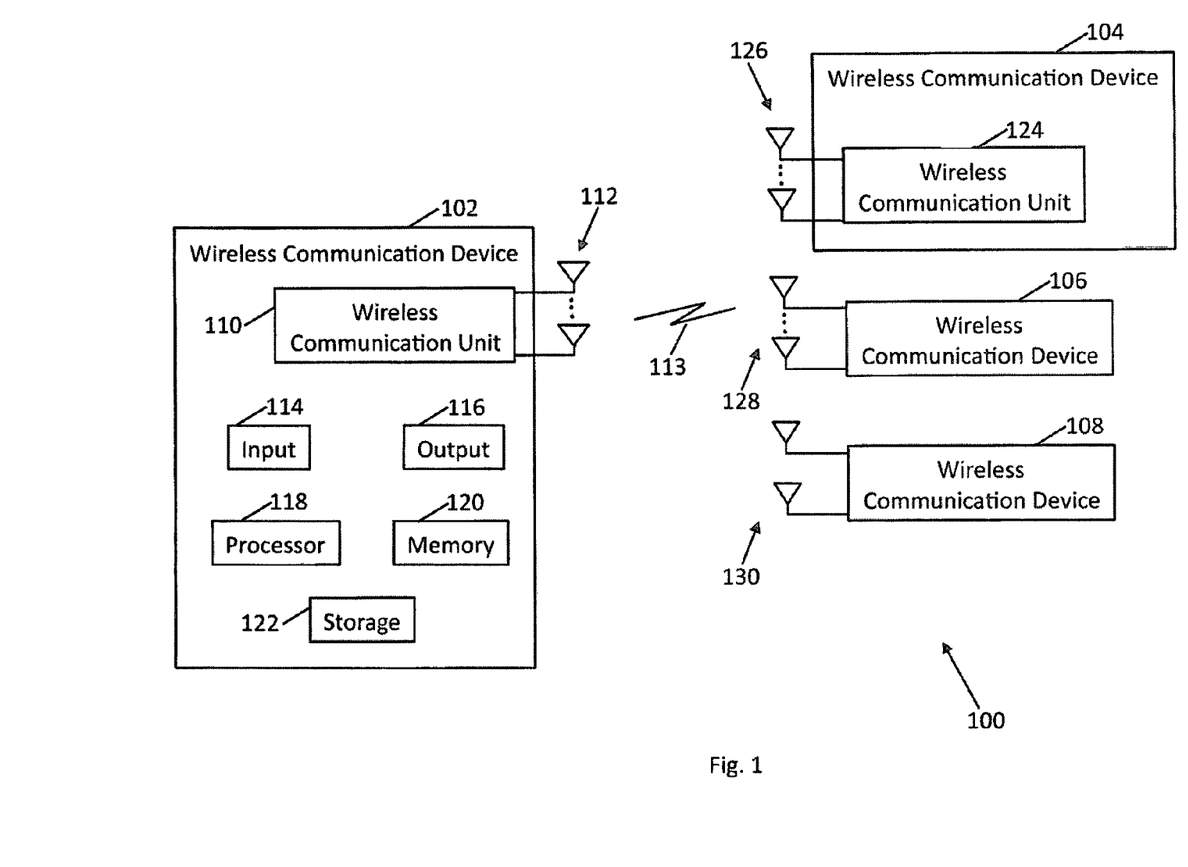
FIG. 1 is a schematic block diagram illustration of a system in accordance with some demonstrative embodiments.

Reference is now made to FIG. 1, which schematically illustrates a block diagram of a system 100 in accordance with some demonstrative embodiments.

As shown in FIG. 1, in some demonstrative embodiments, system 100 may include a wireless communication network including one or more wireless communication devices, e.g., wireless communication devices 102, 104, 106 and/or 108, capable of communicating content, data, information and/or signals over at least one suitable wireless communication channel, for example, a radio channel, an IR channel, a RF channel, a Wireless Fidelity (WiFi) channel, and the like. One or more elements of system 100 may optionally be capable of communicating over any suitable wired communication links.

In some demonstrative embodiments, system 100 may communicate, manage and/or process information in accordance with one or more suitable communication protocols. For example, system 100 may implement one or more of a medium access control (MAC) protocol, a Physical Layer Convergence Protocol (PLCP), a Simple Network Management Protocol (SNMP), an Asynchronous Transfer Mode (ATM) protocol, a Frame Relay protocol, a Systems Network Architecture (SNA) protocol, a Transport Control Protocol (TCP), an Internet Protocol (IP), a Hypertext Transfer Protocol (HTTP), a User Datagram Protocol (UDP), and the like.

In some demonstrative embodiments, wireless communication devices 102, 104, 106 and/or 108 may include, for example, a PC, a desktop computer, a mobile computer, a laptop computer, a notebook computer, a tablet computer, a server computer, a handheld computer, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a STB, a BD player, a BD recorder, a DVD player, a HD DVD player, a DVD recorder, a HD DVD recorder, a PVR, a broadcast HD receiver, a video source, an audio source, a video sink, an audio sink, a stereo tuner, a broadcast radio receiver, a flat panel display, a PMP, a DVC, a digital audio player, a speaker, an audio receiver, a gaming device, an audio amplifier, a data source, a data sink, a DSC, a media player, a Smartphone, a television, a music player, an AP, a base station, or the like.

In some demonstrative embodiments, wireless communication device 110 may include a wireless communication unit 110 to perform Multi-User (MU) Multi-Input-Multi-Output (MIMO) wireless communication with wireless communication devices 104, 106 and/or 108, and/or with one or more other wireless communication devices, e.g., as described below. Wireless communication devices 104, 106 and/or 108 may include a wireless communication unit 124 to perform MU MIMO wireless communication with wireless communication device 102 and/or with one or more other wireless communication devices, e.g., as described below.

In some demonstrative embodiments, wireless communication devices 102, 104, 106 and/or 108 may also include, for example, one or more of a processor 118, an input unit 114, an output unit 116, a memory unit 120 and a storage unit 122. Wireless communication devices 102, 104, 106 and/or 108 may optionally include other suitable hardware components and/or software components. In some demonstrative embodiments, some or all of the components of one or more of wireless communication devices 102, 104, 106 and/or 108 may be enclosed in a common housing or packaging, and may be interconnected or operably associated using one or more wired or wireless links. In other embodiments, components of one or more of wireless communication devices 102, 104, 106 and/or 108 may be distributed among multiple or separate devices.

Processor 118 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 114 executes instructions, for example, of an Operating System (OS) of wireless communication devices 102, 104, 106 and/or 108 and/or of one or more suitable applications.

Input unit 114 includes, for example, a keyboard, a keypad, a mouse, a touch-pad, a track-ball, a stylus, a microphone, or other suitable pointing device or input device. Output unit 116 includes, for example, a monitor, a screen, a flat panel display, a Cathode Ray Tube (CRT) display unit, a Liquid Crystal Display (LCD) display unit, a plasma display unit, one or more audio speakers or earphones, or other suitable output devices.

Memory unit 120 includes, for example, a Random Access Memory (RAM), a Read Only Memory (ROM), a Dynamic RAM (DRAM), a Synchronous DRAM (SDRAM), a flash memory, a volatile memory, a non-volatile memory, a cache memory, a buffer, a short term memory unit, a long term memory unit, or other suitable memory units. Storage unit 122 includes, for example, a hard disk drive, a floppy disk drive, a Compact Disk (CD) drive, a CD-ROM drive, a DVD drive, or other suitable removable or non-removable storage units. Memory unit 120 and/or storage unit 122, for example, may store data processed by wireless communication devices 102, 104, 106 and/or 108.

In some demonstrative embodiments, wireless communication units 110 and/or 124 include, for example, one or more wireless transmitters, receivers and/or transceivers able to send and/or receive wireless communication signals, RF signals, frames, blocks, transmission streams, packets, messages, data items, and/or data. For example, wireless communication units 110 and/or 124 may include or may be implemented as part of a wireless Network Interface Card (NIC), and the like.

In some demonstrative embodiments, wireless communication unit 110 may include, or may be associated with, a plurality of antennas 120. Wireless communication devices 104, 106 and/or 108 may include, or may be associated with, a plurality of antennas 126, 128 and/or 130, respectively. Antennas 120, 126, 128 and/or 130 may include any type of antennas suitable for transmitting and/or receiving wireless communication signals, blocks, frames, transmission streams, packets, messages and/or data. For example, antennas 120, 126, 128 and/or 130 may include internal and/or external RF antennas, dipole antennas, monopole antennas, omni-directional antennas, end fed antennas, circularly polarized antennas, micro-strip antennas, diversity antennas, any suitable configuration, structure and/or arrangement of one or more antenna elements, components, units and/or arrays, e.g., a phased array antenna, a single element antenna, a set of switched beam antennas, and the like. In some embodiments, antennas 120, 126, 128 and/or 130 may implement transmit and receive functionalities using separate transmit and receive antenna elements. In some embodiments, 120, 126, 128 and/or 130 may implement transmit and receive functionalities using common and/or integrated transmit/receive elements.

In some demonstrative embodiments, wireless communication unit 110 may be configured to transmit a MU MIMO transmission 113 to a plurality of user devices, e.g., devices 104, 106 and/or 108, according to a MIMO beamforming (BF) scheme.

In some demonstrative embodiments, MU MIMO transmission 113 may include two or more transmission streams directed to each of devices 104, 106 and/or 108.

In some demonstrative embodiments, wireless communication unit 110 may determine the BF scheme to be used for transmitting MU MIMO transmission 131 to wireless communication devices 104, 106 and/or 108 e.g., as described below.

In order to enable a transmitter to perform a MU MIMO transmission to a plurality of users according to a beamforming scheme, e.g., the conventional Block Diagonalization (BD) beamforming scheme and/or the conventional Regularized BD (RBD) beamforming scheme, the transmitter is to be provided with the entire channel matrix between the transmitter and each of the users. However, transmitting the entire channel matrix from each used back to the transmitter may be cumbersome, may increase an overhead of the MU MIMO communication, may reduce throughput, may increase interference and/or may have any other adverse effects on the MU MIMO communication.

In some demonstrative embodiments, a user device of system 100 may be configured to transmit to wireless communication unit 110 a channel feedback transmission including partial information relating to a MIMO channel matrix between wireless communication unit 110 and the user device. For example, wireless communication unit 124 may be configured to transmit to wireless communication unit 110 a channel feedback transmission including partial information relating to a MIMO channel matrix between wireless communication unit 110 and wireless communication unit 124, e.g., as described below.

In some demonstrative embodiments, wireless communication unit 110 may receive a plurality of channel feedback transmissions from the plurality of user devices, respectively, wherein a channel feedback transmission from a user device of the user devices includes partial information relating to a MIMO channel matrix between the wireless communication unit and the user device. For example, wireless communication unit 110 may receive a first channel feedback transmission from used device 104 including partial information relating to a first MIMO channel matrix between wireless communication unit 110 and user device 104; a second channel feedback transmission from used device 106 including partial information relating to a second MIMO channel matrix between wireless communication unit 110 and user device 106; and/or a third channel feedback transmission from used device 108 including partial information relating to a third MIMO channel matrix between wireless communication unit 110 and user device 108, e.g., as described below.

In some demonstrative embodiments, the channel feedback transmission from a user device may represent a plurality of eigenvectors corresponding to the channel matrix between wireless communication unit 110 and the user device. For example, the first channel feedback transmission may represent a plurality of eigenvectors corresponding to the MIMO channel matrix between wireless communication unit 110 and user device 104; the second channel feedback transmission may represent a plurality of eigenvectors corresponding to the MIMO channel matrix between wireless communication unit 110 and user device 106; and/or the third channel feedback transmission may represent a plurality of eigenvectors corresponding to the MIMO channel matrix between wireless communication unit 110 and user device 108.

In some demonstrative embodiments, a number of the plurality of eigenvectors represented by the channel feedback transmission from the user device may be equal to a number of transmission streams of MU MIMO transmission 113, which are directed to the user device. For example, the number of eigenvectors represented by the first channel feedback transmission from user device 104 may be equal to the number of transmission streams of MU MIMO transmission 113, which are directed to user device 104; the number of eigenvectors represented by the second channel feedback transmission from user device 106 may be equal to the number of transmission streams of MU MIMO transmission 113, which are directed to user device 106; and/or the number of eigenvectors represented by the third channel feedback transmission from user device 108 may be equal to the number of transmission streams of MU MIMO transmission 113, which are directed to user device 108.

In some demonstrative embodiments, the channel feedback transmission from a user device may represent a plurality of dominant eigenvectors corresponding to a respective plurality of dominant eigenvalues of the channel matrix between wireless communication unit 110 and the user device. For example, the first channel feedback transmission may represent a plurality of dominant eigenvectors corresponding to a respective plurality of dominant eigenvalues of the MIMO channel matrix between wireless communication unit 110 and user device 104; the second channel feedback transmission may represent a plurality of dominant eigenvectors corresponding to a respective plurality of dominant eigenvalues of the MIMO channel matrix between wireless communication unit 110 and user device 106; and/or the third channel feedback transmission may represent a plurality of dominant eigenvectors corresponding to a respective plurality of dominant eigenvalues of the MIMO channel matrix between wireless communication unit 110 and user device 108.

In some demonstrative embodiments, the channel feedback transmission from the user device may include or represent quantized values of the plurality of dominant eigenvectors.

In some demonstrative embodiments, the feedback transmission from a user device may include a codebook index representing a plurality of predefined eigenvectors corresponding to the plurality of eigenvectors of the MIMO channel matrix between wireless communication unit 110 and the user device. For example, the first channel feedback transmission may include a codebook index, e.g., a single codebook index, representing a predefined set of codebook eigenvectors corresponding to the plurality of eigenvectors of the MIMO channel matrix between wireless communication unit 110 and user device 104; the second channel feedback transmission may include a codebook index, e.g., a single codebook index, representing a predefined set of codebook eigenvectors corresponding to the plurality of eigenvectors of the MIMO channel matrix between wireless communication unit 110 and user device 106; and/or the third channel feedback transmission may include a codebook index, e.g., a single codebook index, representing a predefined set of codebook eigenvectors corresponding to the plurality of eigenvectors of the MIMO channel matrix between wireless communication unit 110 and user device 108.

In some demonstrative embodiments, the codebook index may include a suitable Single User (SU) MIMO codebook index, e.g., in the form of a preferred matrix index, which may be defined for a SU MIMO transmission scheme. In one example, the codebook index may include a codebook index in accordance with the IEEE 802.16 standards, e.g., the IEEE 802.16m standard, the 3GPP LTE, e.g., the 3GPP LTE Rel-8, and/or any other suitable protocol or standard.

In some demonstrative embodiments, wireless communication unit 110 may be configured to determine the MIMO beamforming scheme of MU MIMO transmission 113 based on the plurality of channel feedback transmissions received from wireless communication devices 104, 106 and/or 108, e.g., as described below.

In some demonstrative embodiments, wireless communication unit 110 may be configured to determine the MIMO beamforming scheme of MU MIMO transmission 113 based on a Modified BD (MBD) algorithm and/or a Modified RBD (MRBD) algorithm, which may utilize partial information relating to the MIMO channel matrix between wireless communication unit 110 and the user devices, e.g., as described below.

In some demonstrative embodiments, the channel feedback transmission from a user device may represent an eigenvector matrix of $N_{SS}$ dominant quantized eigenvectors of the MIMO channel matrix between wireless communication unit 110 and the user device, wherein $N_{SS}$ denotes the number of transmission streams of transmission 113 directed to the user device. In one example, wireless communication unit 110 may receive from wireless communication unit 124 a suitable codebook index representing the matrix of $N_{SS}$ dominant quantized eigenvectors of the MIMO channel matrix between wireless communication unit 110 and wireless communication device 104.

In some demonstrative embodiments, wireless communication unit 110 may determine, e.g., based on the plurality of channel feedback transmissions, a plurality of eigenvector matrices, denoted $V_i$, each including $N_{SS}$ dominant quantized eigenvectors corresponding to a respective i-th user device, wherein i=1 ... K, and wherein K denotes the number of users intended to receive MU MIMO transmission 113. In one embodiment, wireless communication unit 110 may receive K codebook indices from the K user devices, respectively, and determine K matrices $V_i$ based on the K codebook indices, respectively. In other embodiments, wireless communication unit 110 may determine matrices $V_i$ based on any other suitable channel feedback.

In some demonstrative embodiments, wireless communication unit 110 may determine the MIMO beamforming scheme based on the plurality of eigenvectors, e.g., the $N_{SS}$ dominant quantized eigenvectors, corresponding to the i-th user device, and based on a plurality of interference matrices corresponding to the plurality of user devices, respectively. An interference matrix corresponding to the i-th user device may include a plurality of eigenvectors corresponding to other user devices of the plurality of user devices, e.g., as described below.

In some demonstrative embodiments, an interference matrix, denoted $\tilde{V}_i$, may be defined with respect to the i-th user device, e.g., as follows:

$$\tilde{V}_i = [V_1 \ldots V_{i-1}, V_{i+1} \ldots V_K] \tag{1}$$

In some demonstrative embodiments, Single Value Decomposition (SVD) of the interference matrix $\tilde{V}_i$ may yield:

$$\tilde{V}_i = \tilde{U}_i \tilde{\Sigma}_i \tilde{W}_i^H \tag{2}$$

wherein $\tilde{U}_i$ denotes a ($M_T$-by-$M_T$) unitary matrix over a field, denoted M, which includes the matrix $\tilde{V}_i$; wherein $M_T$ denotes a number of transmit antennas 112 utilized by wireless communication unit 110 to perform transmission 113; wherein $\tilde{\Sigma}_i$ denotes a ($M_T$-by-$(K-1)N_{SS}$) diagonal matrix with nonnegative real numbers on the diagonal; wherein $\tilde{W}_i$ denotes a ($(K-1)N_{SS}$-by-$(K-1)N_{SS}$) unitary matrix over M; and wherein $\tilde{W}_i^H$ denotes a conjugate of $\tilde{W}^i$.

In some demonstrative embodiments, a matrix, denoted $\tilde{U}_i^{(1)}$, may be determined as a basis of a space spanned by all the dominant eigenvectors of the users other than the i-th user. For example, the matrix $\tilde{U}_i^{(1)}$ may include a set of eigenvectors of the matrix $\tilde{U}_i$ corresponding to non-zero singular values.

In some demonstrative embodiments, a first precoding vector, denoted $V_{i1}'$, may be determined, for example, by orthogonalizing a first eigenvector, denoted $V_{i1}$, of the matrix $V_i$, e.g., the eigenvector corresponding to the maximal eigenvalue of the MIMO channel matrix of the i-th user, to the basis $\tilde{U}_i^{(1)}$.

In some demonstrative embodiments, an updated basis, denoted $U_{i1}'$, may be determined based on the basis $\tilde{U}_i^{(1)}$ and the precoding vector $V_{i1}'$. For example, the updated basis $U_{i1}'$ may be determined by concatenating the basis $\tilde{U}_i^{(1)}$ with the first precoding vector $V_{i1}'$, e.g., as follows:

$$U_{i1}' = [\tilde{U}_i^{(1)} V_{i1}'] \qquad (3)$$

In some demonstrative embodiments, a second precoding vector, denoted $V_{i2}'$, may be determined, for example, by orthogonalizing a second eigenvector, denoted $V_{i2}$, of the matrix $V_i$, e.g., the eigenvector corresponding to the second maximal eigenvalue of the MIMO channel matrix of the i-th user, to the updated basis $U_{i1}'$; and a second updated basis, denoted $U_{i2}'$, may be determined by concatenating the updated basis $U_{i1}'$ with the second precoding vector $V_{i2}'$, e.g., as follows:

$$U_{i2}' = [U_{i1}' V_{i2}'] \qquad (4)$$

In some demonstrative embodiments, the operations described above may be repeated, e.g., to determine $N_{SS}$ precoding vectors. For example, an l-th precoding vector, denoted $V_{il}'$, wherein $l=2 \ldots N_{SS}$, may be determined, for example, by orthogonalizing an l-th eigenvector, denoted $V_{il}$, of the matrix $V_i$, e.g., the eigenvector corresponding to the l-th maximal eigenvalue of the MIMO channel matrix of the i-th user, to the updated basis $U_{i(l-1)}'$, which may be determined by concatenating a previously updated basis $U_{i(l-2)}'$ with a previously determined (l-1)-th precoding vector $V_{i(l-1)}'$, e.g., as follows:

$$U_{i(l-1)}' = [U_{i(l-2)}' V_{i(l-1)}'] \qquad (5)$$

In some demonstrative embodiments, a beamforming precoding matrix, denoted $V_i'$, for the i-th user device may be formed by combining the $N_{SS}$ precoding vectors corresponding to the i-th user, e.g., as follows:

$$V_i' = [V_{i1}' V_{i2}' \ldots V_{iN_{SS}}'] \qquad (6)$$

In some demonstrative embodiments, wireless communication unit 110 may repeat the calculations described above with reference to Equations 1, 2, 3, 4, 5 and/or 6, e.g., to determine K beamforming precoding matrices corresponding to the K user devices, respectively.

In some demonstrative embodiments, wireless communication unit 110 may determine a beamforming matrix, denoted B', to be used for performing MU MIMO transmission 113, to the K user devices, based on the K beamforming precoding matrices. For example, wireless communication unit 110 may determine the beamforming matrix B' by concatenating the K beamforming precoding matrices, e.g., as follows:

$$B' = [V_1' V_2' \ldots V_K'] \qquad (7)$$

In some demonstrative embodiments, wireless communication unit 110 may transmit multi-user MIMO transmission 113 using the beamforming matrix B'.

In some demonstrative embodiments, the beamforming matrix determined according to the operations described above with reference to Equations 1, 2, 3, 4, 5, 6 and/or 7 may be substantially near optimal, for example, at relatively high levels of Signal-to-Noise-Ratio (SNR), for example, when inter-user interferences may be dominant, e.g., compared to receiver thermal noise.

Figure 2:
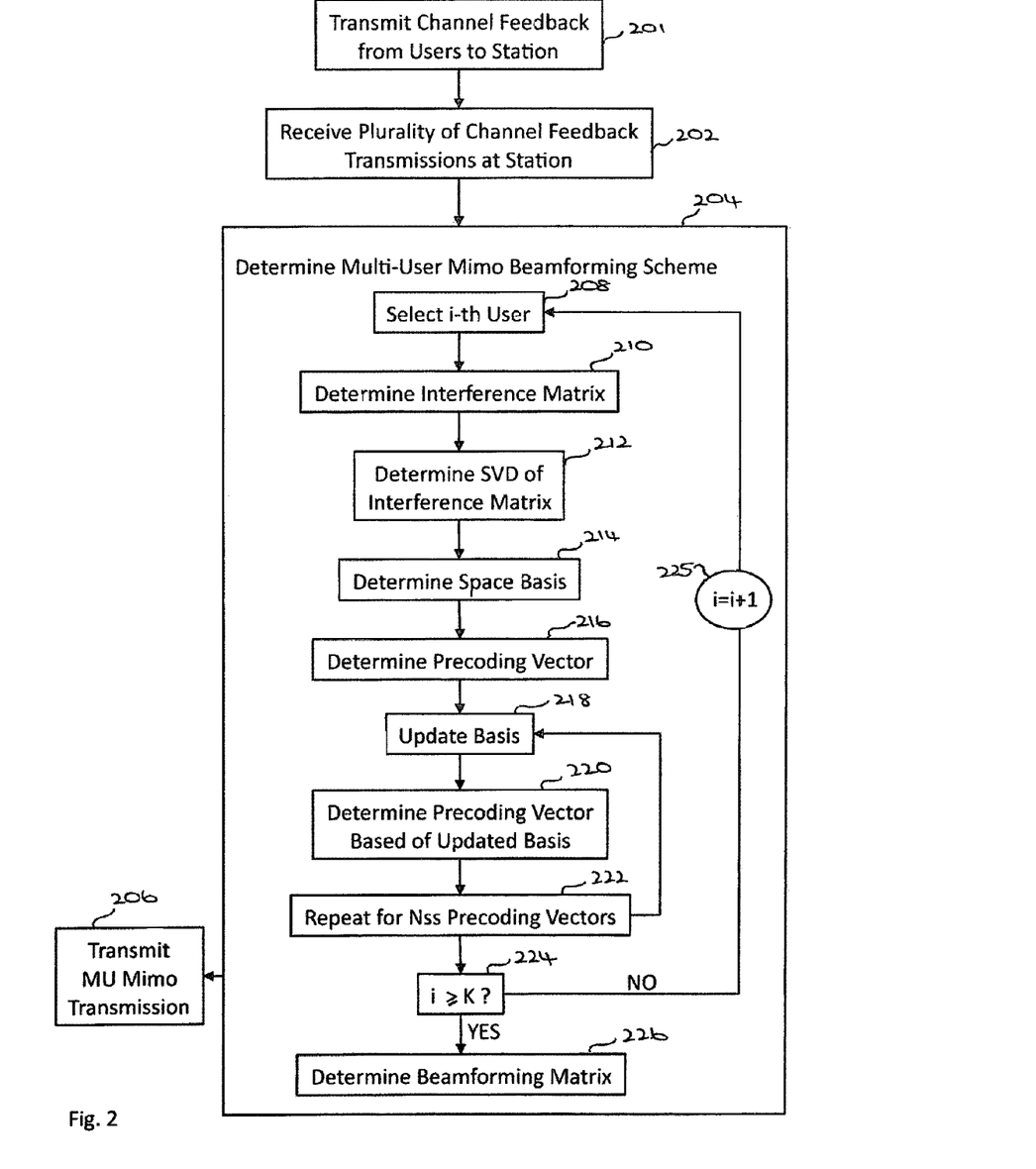
FIG. 2 is a schematic flow-chart illustration of a method of wireless communication, in accordance with some demonstrative embodiments.

Reference is made to FIG. 2, which schematically illustrates a method of multi-user MIMO communication, in accordance with some demonstrative embodiments. In some demonstrative embodiments, one or more of the operations of the method of FIG. 2 may be performed by one or more elements of a system, e.g., system 100 (FIG. 1), e.g., one or more wireless communication devices, e.g., wireless communication devices 102, 104, 106 and/or 108 (FIG. 1), one or more wireless communication units, e.g., wireless communication units 110 and/or 124 (FIG. 1), and/or any other element. In some embodiments, one or more of the operations of the method of FIG. 2 may be performed as part of a MBD algorithm, e.g., including one or more of the operations described above with reference to Equations 1, 2, 3, 4, 5, 6 and/or 7.

As indicated at block 202, the method may include receiving at a wireless communication device a plurality of channel feedback transmissions from a plurality of user devices, respectively. A channel feedback transmission from a user device of the user devices may include partial information relating to a multi-user MIMO channel matrix between the wireless communication unit and the user device. For example, wireless communication unit 110 (FIG. 1) of wireless communication device 102 (FIG. 1) may receive a plurality of channel feedback transmissions from wireless communication devices 104, 106 and/or 108 (FIG. 1), e.g., as described above.

As indicated at block 201, the method may include transmitting a channel feedback transmission from at least one user device, e.g., from each of the user devices, to the wireless communication device.

In some demonstrative embodiments, the channel feedback transmission may represent, for example, a plurality of eigenvectors corresponding to the MIMO channel matrix between the user and the wireless communication device. For example, wireless communication unit 124 (FIG. 1) of the i-th user may transmit to wireless communication unit 110 (FIG. 1) a channel feedback transmission representing the matrix $V_i$, e.g., as described above with reference to FIG. 1.

As indicated at block 204, the method may include determining a MIMO beamforming scheme based on the plurality of channel feedback transmissions. In some demonstrative embodiments, determining the MIMO beamforming scheme may include determining the MIMO beamforming scheme according to a MBD algorithm. For example, wireless communication unit 110 (FIG. 1) may determine the MIMO beamforming scheme based on the channel feedback transmissions received from wireless communication devices 104, 106 and/or 108 (FIG. 1).

As indicated at block 208, determining the MIMO beamforming scheme may include selecting the i-th user. For example, one or more of the operations described below with reference to blocks 210, 212, 214, 216, 218, 220 and/or 224 may be repeated with respect to one or more of the users, e.g., for all of the users. Accordingly, at a first iteration, the method may include selecting, for example, a first user.

As indicated at block 210, determining the MIMO beamforming scheme may include determining the interference matrix $\tilde{V}_i$, e.g., as described above with reference to Equation 1.

As indicated at block 212, determining the MIMO beamforming scheme may include determining the SVD of the interference matrix $\tilde{V}_i$, e.g., as described above with reference to Equation 2.

As indicated at block 214, the method may include determining a basis of a space spanned by all the dominant eigenvectors of the users other than the i-th user. For example, determining the basis may include determining the basis $\tilde{U}_i^{(1)}$ including a set of eigenvectors of the matrix $\tilde{U}_i$ corresponding to non-zero singular values, e.g., as described above.

As indicated at block 216, determining the MIMO beamforming scheme may include determining the precoding vector $V_{i1}'$. For example, determining the precoding vector $V_{i1}'$ may include orthogonalizing the first eigenvector $V_{i1}$ of the matrix $V_i$ to the basis $\tilde{U}_i^{(1)}$, e.g., as described above with reference to FIG. 1.

As indicated at block 218, determining the MIMO beamforming scheme may include determining an updated basis based on the basis $\tilde{U}_i^{(1)}$. For example, determining the updated basis may include determining the basis $U_{i1}'$ based on the basis $\tilde{U}_i^{(1)}$ and the precoding vector $V_{i1}'$, e.g., as described above with reference to Equation 3.

As indicated at block 220, determining the MIMO beamforming scheme may include determining a next precoding vector $V_{i2}'$. For example, determining the precoding vector $V_{i2}'$ may include orthogonalizing the second eigenvector $V_{i2}$ of the matrix $V_i$ to the updated basis $U_{i1}'$, e.g., as described above with reference to FIG. 1.

As indicated at block 222, determining the MIMO beamforming scheme may include repeating the operations of blocks 218 and 220, e.g., until determining $N_{SS}$ precoding vectors, e.g., as described above.

As indicated at blocks 224 and 225, determining the MIMO beamforming scheme may include increasing the value of i and repeating the operations of blocks 208, 210, 212, 214, 216, 218, 220 and/or 222, for the next user, for example, to determine K beamforming precoding matrices corresponding to the K user devices, respectively, e.g., as described above.

As indicated at block 226, determining the MIMO beamforming scheme may include determining a beamforming matrix based on the K beamforming precoding matrices. For example, determining the beamforming matrix may include determining the matrix B', e.g., as described above with reference to Equation 7.

As indicated at block 206, the method may include transmitting a multi-user MIMO transmission from the wireless communication device to the plurality of users according to a MIMO beamforming scheme, which is based on the plurality of channel feedback transmissions. For example, wireless communication unit 110 (FIG. 1) may transmit multi-user MIMO transmission 113 (FIG. 1) using the beamforming matrix B', e.g., as described above.

Figure 3:
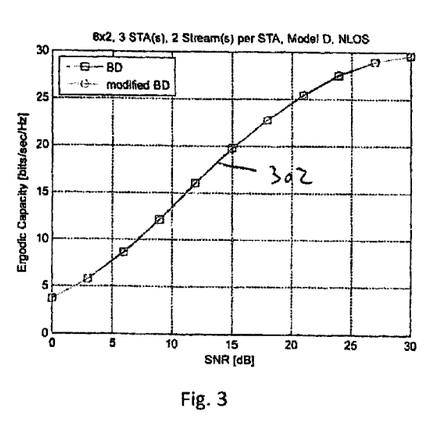
FIG. 3 is a schematic illustration of a graph depicting ergodic capacity as a function of signal-to-noise-ratio (SNR) for a multi-user multi-input-multi-output (MIMO) transmission utilizing channel feedbacks including partial MIMO channel information, in accordance with some demonstrative embodiments.

Reference is made to FIG. 3, which schematically illustrates a graph 302 depicting ergodic capacity as a function of SNR for a multi-user MIMO transmission utilizing channel feedbacks including partial MIMO channel information, in accordance with some demonstrative embodiments.

Graph 302 depicts ergodic capacity results, in units of bits per second per Hertz (Hz), with respect to an 8×2 antenna configuration with three user devices and $N_{SS}$=2 streams and a channel according to model D of IEEE802.11TGac.

Graph 302 depicts the ergodic capacity achieved by a MBD algorithm, e.g., as described above with reference to FIG. 2. As shown in FIG. 3, the results according to the MBD algorithm may be similar to the results using a conventional BD algorithm. However, it is noted that, in contrast to the conventional BD scheme, the MBD algorithm requires partial MIMO channel matrix feedback information.

Referring back to FIG. 1, in some demonstrative embodiments, the channel feedback transmission from one or more of the user devices may also represent a channel quality indicator corresponding to a quality of a channel between the wireless communication unit and the one or more user devices, respectively. For example, the first channel feedback transmission may represent a channel quality indicator corresponding to a quality of the channel between wireless communication unit 110 and user device 104; the second channel feedback transmission may represent a channel quality indicator corresponding to a quality of the channel between wireless communication unit 110 and user device 106; and/or the third channel feedback transmission may represent a channel quality indicator corresponding to a quality of the channel between wireless communication unit 110 and user device 108.

In some demonstrative embodiments, the channel quality indicator from a user device may represent at least one of a SNR, a Signal-to-Noise-Interference Ratio (SINR), and a Modulation and Coding Scheme (MCS) corresponding to the channel between wireless communication unit 110 and the user device. In other embodiments, the channel feedback transmission may include any other suitable information relating to and/or representing the channel between wireless communication unit 110 and the user device. Although some demonstrative embodiments are described below with reference to the SNR, other embodiments may be implemented with respect to any other suitable channel quality indicator or parameter.

In some demonstrative embodiments, wireless communication unit 110 may determine the beamforming scheme for MU MIMO transmission 113 based on the received channel quality indicators, e.g., as described below.

In some demonstrative embodiments, a vector basis may be determined, with respect to the i-th user, for a space spanned by scaled eigenvectors of all users other than the i-th user, for example, by eigenvalue decomposition of the following matrix:

$$\tilde{V}_i \tilde{D}_i \tilde{V}_i^H + \tilde{I}_{M_T} = \tilde{U}_i \tilde{S}_i \tilde{U}_i^H \qquad (8)$$

wherein $\tilde{D}_i$ denotes a diagonal matrix, e.g., as follows:

$$\tilde{D}_i = \mathrm{diag}(\rho_{11} \ldots \rho_{1N_{SS}} \ldots \rho_{(i-1)1} \ldots \rho_{(i-1)N_{SS}} \rho_{(i+1)1} \ldots \rho_{(i+1)N_{SS}} \ldots \rho_{K1} \ldots \rho_{KN_{SS}}) \qquad (9)$$

wherein $\rho_{ij}$ denotes a SNR of a j-th stream of the i-th user, wherein j=1 ... $N_{SS}$,
wherein $I_{M_T}$ denotes an identity matrix of a dimension $M_T$,
wherein $\tilde{U}_i$ denotes an unscaled basis matrix,
and wherein $\tilde{S}_i$ denotes a scaling matrix.

In some demonstrative embodiments, an unscaled basis matrix, denoted $U_i'$, may be defined as follows:

$$U_i' = \tilde{U}_i \tilde{S}_i^{-1/2} \qquad (10)$$

In some demonstrative embodiments, the matrix $V_i$ may be projected to the space spanned by columns of the matrix $U_i'$. The matrix $V_i$ may be pre-multiplied by a square root of the diagonal matrix $D_i = \mathrm{diag}(\rho_{i1} \ldots \rho_{iN_{SS}})$, for example, prior to projecting the matrix $V_i$, e.g., in order to reflect the contribution of the SNR of the $N_{SS}$ streams. For example, the projection of the pre-multiplied matrix $V_i$ may yield a projected matrix, denoted $V_i'$, e.g., as follows:

$$V_i' = U_i' U_i'^H (V_i D_i^{1/2}) = \tilde{U}_i \tilde{S}_i^{-1} \tilde{U}_i^H (V_i D_i^{1/2}) \qquad (11)$$

In some demonstrative embodiments, wireless communication unit 110 may perform SVD of the projected interference matrix $V_i'$ of Equation 11, to yield:

$$V_i' = Y_i \Sigma_i W_i^H \qquad (12)$$

wherein $Y_i$ denotes a ($M_T$-by-$M_T$) unitary matrix over a field, denoted M', which includes the matrix $V_i'$; wherein $\Sigma_i$ denotes a ($M_T$-by-$N_{SS}$) diagonal matrix with nonnegative real numbers on the diagonal; wherein $W_i$ denotes a ($N_{SS}$-by-$N_{SS}$) unitary matrix over M'; and wherein $W_i^H$ denotes a conjugate transpose of $W_i$.

In some demonstrative embodiments, wireless communication unit 110 may determine K beamforming matrices corresponding to the K user devices, wherein the beamforming matrix for the i-th user, denoted $Y_i^{(1)}$, may include the first $N_{SS}$ left dominant eigenvectors of the matrix $V_i'$.

In some demonstrative embodiments, wireless communication unit 110 may determine a beamforming matrix, denoted B", to be used for performing MU MIMO transmission 113 to the K user devices based on the K beamforming matrices. For example, wireless communication unit 110 may determine the beamforming matrix B;' by concatenating the K beamforming matrices, e.g., as follows:

$$B''=[Y_1^{(1)} \ldots Y_K^{(1)}] \quad (13)$$

Figure 4:
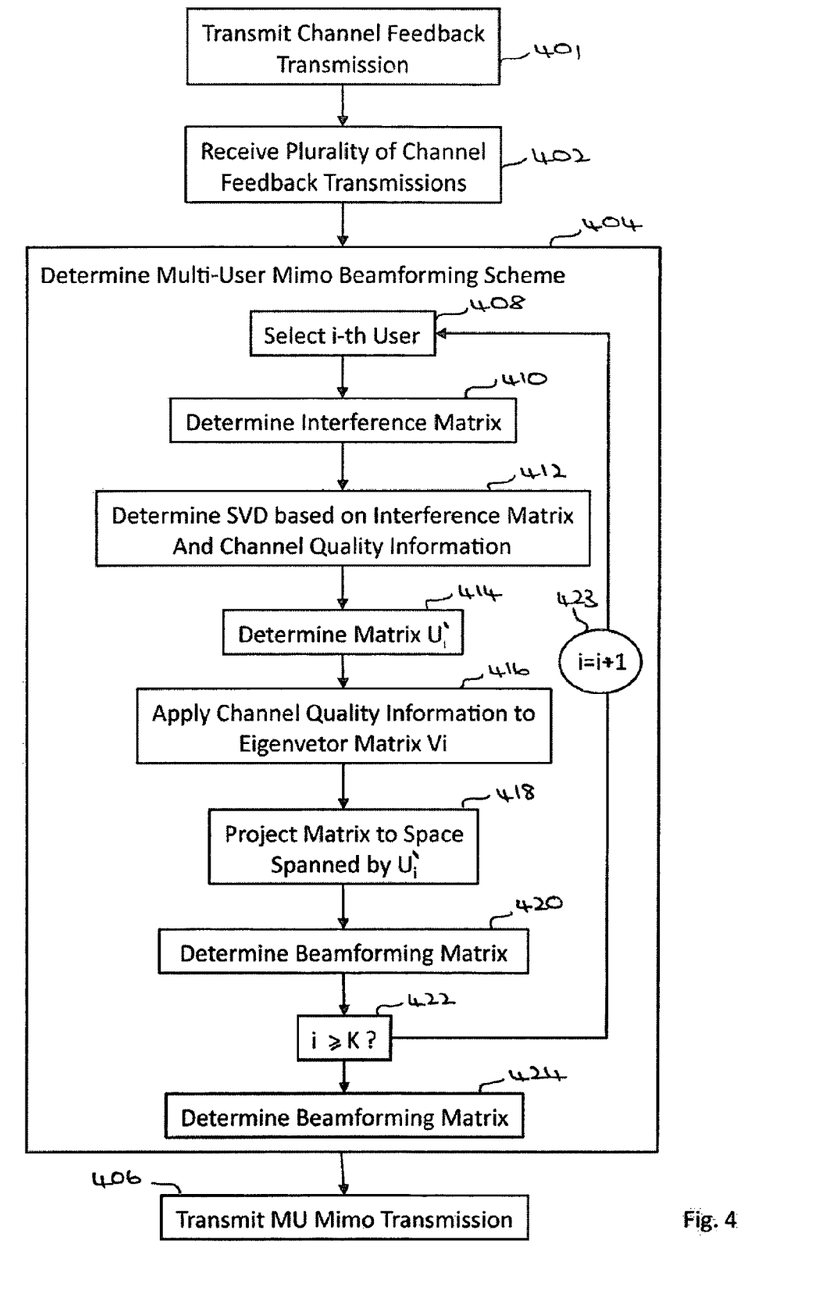
FIG. 4 is a schematic flow-chart illustration of a method of wireless communication, in accordance with some demonstrative embodiments.

Reference is made to FIG. 4, which schematically illustrates a method of multi-user MIMO communication, in accordance with some demonstrative embodiments. In some demonstrative embodiments, one or more of the operations of the method of FIG. 4 may be performed by one or more elements of a system, e.g., system 100 (FIG. 1), e.g., one or more wireless communication devices, e.g., wireless communication devices 102, 104, 106 and/or 108 (FIG. 1), one or more wireless communication units, e.g., wireless communication units 110 and/or 124 (FIG. 1), and/or any other element. In some embodiments, one or more of the operations of the method of FIG. 4 may be performed as part of a MRBD algorithm, e.g., as described above with reference to Equations 8, 9, 10, 11, 12 and/or 13.

As indicated at block 402, the method may include receiving at a wireless communication device a plurality of channel feedback transmissions from a plurality of user devices, respectively. A channel feedback transmission from a user device of the user devices may include partial information relating to a multi-user MIMO channel matrix between the wireless communication unit and the user device. The channel feedback transmission from the user may also represent a channel quality indicator corresponding to a quality of a channel between the wireless communication device and the user. For example, wireless communication unit 110 (FIG. 1) of wireless communication device 102 (FIG. 1) may receive a plurality of channel feedback transmissions from wireless communication devices 104, 106 and/or 108 (FIG. 1), e.g., as described above.

As indicated at block 401, the method may include transmitting a channel feedback transmission from at least one user device, e.g., from each of the user devices, to the wireless communication device.

In some demonstrative embodiments, the channel feedback transmission may represent, for example, a plurality of eigenvectors corresponding to the MIMO channel matrix between the user and the wireless communication device. For example, wireless communication unit 124 (FIG. 1) of the i-th user may transmit to wireless communication unit 110 (FIG. 1) a channel feedback transmission representing the matrix $V_i$ and the channel quality indicator, e.g., as described above with reference to FIG. 1.

As indicated at block 404, the method may include determining a MIMO beamforming scheme based on the plurality of channel feedback transmissions. In some demonstrative embodiments, determining the MIMO beamforming scheme may include determining the determining the MIMO beamforming scheme based on a MRBD algorithm. For example, wireless communication unit 110 (FIG. 1) may determine the MIMO beamforming scheme based on the channel feedback transmissions received from wireless communication devices 104, 106 and/or 108 (FIG. 1), e.g., as described above.

As indicated at block 408, determining the MIMO beamforming scheme may include selecting the i-th user. For example, one or more of the operations described below with reference to blocks 410, 412, 414, 416, 418 and/or 420 may be repeated with respect to one or more of the users, e.g., for all of the users. Accordingly, at a first iteration, the method may include selecting, for example, a first user.

As indicated at block 410, determining the MIMO beamforming scheme may include determining the interference matrix $\tilde{V}_i$, e.g., as described above with reference to Equation 1.

As indicated at block 412, determining the MIMO beamforming scheme may include determining the SVD of a matrix, e.g., the matrix $\tilde{V}_i \tilde{D}_i \tilde{V}_i^H + I_{M_T}$, which is based on the interference matrix $\tilde{V}_i$ and the channel quality information, e.g., the matrix $\tilde{D}_i$, e.g., as described above.

As indicated at block 414, the method may include determining the unsealed basis matrix $U_i'$ based on the SVD, e.g., as described above with reference to Equation 10.

As indicated at block 416, the method may include applying the channel quality information to the eigenvector matrix $V_i$, for example, by pre-multiplying the matrix $V_i$ by a square root of the diagonal matrix $D_i = \text{diag}(\rho_{i1} \ldots \rho_{iN_{SS}})$, e.g., as described above.

As indicated at block 418, the method may include projecting the pre-multiplied matrix $V_i$ to the space spanned by columns of the matrix $U_i'$, e.g., as described above with reference to Equation 11.

As indicated at block 420, the method may include determining a beamforming matrix corresponding to the i-th user based on the projected interference matrix. For example, determining the beamforming matrix corresponding to the i-th user may include performing SVD of the projected interference matrix and selecting the first $N_{SS}$ left dominant eigenvectors of the matrix $V_i'$, e.g., as described above.

As indicated at blocks 422 and 423, determining the MIMO beamforming scheme may include increasing the value of i and repeating the operations of blocks 408, 410, 412, 414, 416, 418, and/or 420 for the next user, for example, to determine K beamforming matrices corresponding to the K user devices, respectively, e.g., as described above.

As indicated at block 424, determining the MIMO beamforming scheme may include determining a beamforming matrix based on the K beamforming matrices. For example, determining the beamforming matrix may include determining the matrix B", e.g., as described above with reference to Equation 13.

As indicated at block 406, the method may include transmitting a multi-user MIMO transmission from the wireless communication device to the plurality of users according to a MIMO beamforming scheme, which is based on the plurality of channel feedback transmissions. For example, wireless communication unit 110 (FIG. 1) may transmit multi-user MIMO transmission 113 (FIG. 1) using the beamforming matrix B", e.g., as described above.

Figure 5:
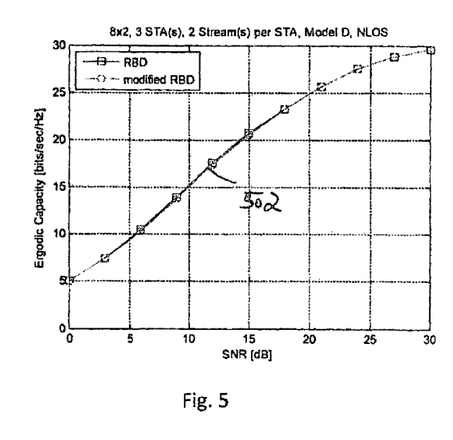
FIG. 5 is a schematic illustration of a graph depicting ergodic capacity as a function of SNR for a multi-user MIMO transmission utilizing channel feedbacks including channel quality indications and partial MIMO channel information, in accordance with some demonstrative embodiments.

Reference is made to FIG. 5, which schematically illustrates a graph 502 depicting ergodic capacity as a function of SNR for a multi-user MIMO transmission utilizing channel feedbacks including channel quality indications and partial MIMO channel information, in accordance with some demonstrative embodiments.

Graph 502 depicts ergodic capacity results, in units of bits per second per Hz, with respect to an 8×2 antenna configuration with three user devices and $N_{SS}$=2 streams and a channel according to model D of IEEE802.11TGac. Graph 502 depicts the ergodic capacity achieved by a MRBD algorithm, e.g., as described above with reference to FIG. 4. As shown in FIG. 5, the results according to the MRBD algorithm may be similar to the results using a conventional RBD algorithm. However, it is noted that, in contrast to the conventional RBD algorithm, the MRBD algorithm requires partial MIMO channel matrix feedback information.

Figure 6:
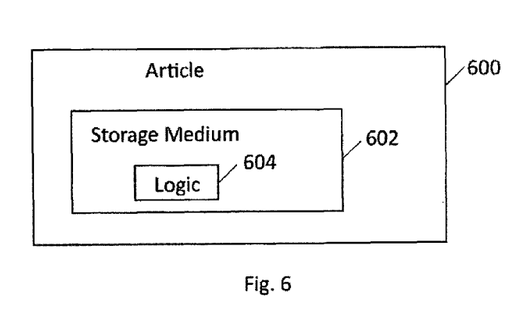
FIG. 6 is a schematic illustration of an article of manufacture, in accordance with some demonstrative embodiments.

Reference is made to FIG. 6, which schematically illustrates an article of manufacture 600, in accordance with some demonstrative embodiments. Article 600 may include a machine-readable storage medium 602 to store logic 604, which may be used, for example, to perform at least part of the functionality of wireless communication unit 110 (FIG. 1) and/or wireless communication unit 124 (FIG. 1), and/or to perform one or more operations of the methods of FIGS. 2 and/or 4.

In some embodiments, article 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, random-access memory (RAM), dynamic RAM (DRAM), Double-Data-Rate DRAM (DDR-DRAM), synchronous DRAM (SDRAM), static RAM (SRAM), read-only memory (ROM), programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Functions, operations, components and/or features described herein with reference to one or more embodiments, may be combined with, or may be utilized in combination with, one or more other functions, operations, components and/or features described herein with reference to one or more other embodiments, or vice versa.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A wireless communication device including:
a wireless communication unit including a transmitter and a receiver, the transmitter to transmit a multi-user multi-input-multi-output (MIMO) transmission to a plurality of user devices according to a MIMO beamforming scheme, the multi-user MIMO transmission including two or more transmission streams directed to a user device of said plurality of user devices,
wherein the receiver is to receive a plurality of channel feedback transmissions from the plurality of user devices, respectively, wherein a channel feedback transmission from the user device represents a plurality of dominant eigenvectors corresponding to a respective plurality of dominant eigenvalues of a MIMO channel matrix between the wireless communication unit and the user device,
and wherein the wireless communication unit is to determine the MIMO beamforming scheme based on the plurality of channel feedback transmissions, said MIMO beamforming scheme being based on a plurality of beamforming matrices corresponding to said plurality of user devices, said wireless communication unit to determine a beamforming matrix corresponding to the user device based on a plurality of beamforming vectors, said wireless communication unit to determine said plurality of beamforming vectors based on an interference matrix corresponding to the user device, the interference matrix including a plurality of eigenvector matrices corresponding to other user devices of said plurality of user devices, an eigenvector matrix corresponding to a respective other user device including a plurality of eigenvectors represented by the channel feedback transmission from the other user device.

2. The wireless communication device of claim 1, wherein a number of the plurality of eigenvectors represented by the channel feedback transmission from the user device is equal to a number of the transmission streams directed to the user device, and wherein a number of said plurality of beamforming vectors is equal to the number of the transmission streams directed to the user device.

3. The wireless communication device of claim 1, wherein the channel feedback transmission from the user device represents a channel quality indicator corresponding to a quality of a channel between the wireless communication unit and the user device, and wherein the wireless communication unit is to determine a projected interference matrix based on the channel quality indicator and the interference matrix corresponding to the user device, and to determine the plurality of beamforming vectors corresponding to the user device based on a Single Value Decomposition of the projected interference matrix.

4. The wireless communication device of claim 3, wherein the channel quality indicator represents at least one parameter selected from the group consisting of a signal-to-noise-ratio, a signal-to-noise-interference ratio, and a modulation and coding scheme.

5. The wireless communication device of claim 1, wherein the channel feedback transmission includes a codebook index representing a plurality of predefined vectors approximating the plurality of eigenvectors of the MIMO channel matrix.

6. The wireless communication device of claim 1, wherein the multi-user MIMO transmission includes two or more transmission streams directed to each one of the user devices.

7. A wireless communication device including:
a wireless communication unit including a transmitter and a receiver, the transmitter to transmit a multi-user multi-input-multi-output (MIMO) transmission to a plurality of user devices according to a MIMO beamforming scheme, the multi-user MIMO transmission including two or more transmission streams directed to a user device of said plurality of user devices,
wherein the receiver is to receive a plurality of channel feedback transmissions from the plurality of user devices, respectively, wherein a channel feedback transmission from the user device represents a plurality of eigenvectors corresponding to a MIMO channel matrix between the wireless communication unit and the user device,
wherein the wireless communication unit is to determine the MIMO beamforming scheme based on the plurality of channel feedback transmissions, said MIMO beamforming scheme being based on a plurality of beamforming matrices corresponding to said plurality of user devices, said wireless communication unit is to determine a beamforming matrix corresponding to the user device based on a plurality of beamforming vectors corresponding to the user device, said wireless communication unit is to determine the plurality of beamforming vectors corresponding to the user device based on a Single Value Decomposition of an interference matrix corresponding to the user device, the interference matrix including a plurality of eigenvector matrices corresponding to other user devices of said plurality of user devices, an eigenvector matrix corresponding to a respective other user device including a plurality of eigenvectors represented by the channel feedback transmission from the other user device.

8. The wireless communication device of claim 7, wherein the channel feedback transmission includes a codebook index representing a plurality of predefined vectors approximating the plurality of eigenvectors of the MIMO channel matrix.

9. A wireless communication system including:
a wireless communication device including:
a plurality of antennas; and
a wireless communication unit including a transmitter and a receiver, the transmitter to transmit a multi-user multi-input-multi-output (MIMO) transmission to a plurality of user devices according to a MIMO beamforming scheme, the multi-user MIMO transmission including two or more transmission streams directed to a user device of said plurality of user devices,
wherein the receiver is to receive a plurality of channel feedback transmissions from the plurality of user devices, respectively, wherein a channel feedback transmission from a user device of the user devices includes partial information relating to a MIMO channel matrix between the wireless communication unit and the user device, the channel feedback transmission from the user device representing a plurality of dominant eigenvectors corresponding to a respective plurality of dominant eigenvalues of the MIMO channel matrix,
and wherein the wireless communication unit is to determine the MIMO beamforming scheme based on the plurality of channel feedback transmissions, said MIMO beamforming scheme being based on a plurality of beamforming matrices corresponding to said plurality of user devices, said wireless communication unit to determine a beamforming matrix corresponding to the user device based on a plurality of beamforming vectors, said wireless communication unit to determine said plurality of beamforming vectors based on an interference matrix corresponding to the user device, the interference matrix including a plurality of eigenvector matrices corresponding to other user devices of said plurality of user devices, an eigenvector matrix corresponding to a respective other user device including a plurality of eigenvectors represented by the channel feedback transmission from the other user device.

10. The wireless communication system of claim 9, wherein a number of the plurality of eigenvectors represented by the channel feedback transmission from the user device is equal to a number of the transmission streams directed to the user device, and wherein a number of said plurality of beamforming vectors is equal to the number of the transmission streams directed to the user device.

11. The wireless communication system of claim 9, wherein the channel feedback transmission includes a codebook index representing a plurality of predefined vectors corresponding to the plurality of eigenvectors of the MIMO channel matrix.

12. The wireless communication system of claim 9, wherein the channel feedback transmission from the user device represents a channel quality indicator corresponding to a quality of a channel between the wireless communication unit and the user device, and wherein the wireless communication unit is to determine a projected interference matrix based on the channel quality indicator and the interference matrix corresponding to the user device, and to determine the plurality of beamforming vectors corresponding to the user device based on a Single Value Decomposition of the projected interference matrix.

13. The wireless communication system of claim 9, wherein the multi-user MIMO transmission includes two or more transmission streams directed to each one of the user devices.

14. The wireless communication system of claim 9 including the user device.

15. A wireless communication system including:
a wireless communication device including:
a plurality of antennas; and
a wireless communication unit including a transmitter and a receiver, the transmitter to transmit a multi-user multi-input-multi-output (MIMO) transmission to a plurality of user devices according to a MIMO beamforming scheme, the multi-user MIMO transmission including two or more transmission streams directed to a user device of said plurality of user devices,
wherein the receiver is to receive a plurality of channel feedback transmissions from the plurality of user devices, respectively, wherein a channel feedback transmission from a user device of the user devices includes partial information relating to a MIMO channel matrix between the wireless communication unit and the user device, the channel feedback transmission from the user device representing a plurality of eigenvectors corresponding to the MIMO channel matrix,
wherein the wireless communication unit is to determine the MIMO beamforming scheme based on the plurality of channel feedback transmissions, said MIMO beamforming scheme being based on a plurality of beamforming matrices corresponding to said plurality of user devices, said wireless communication unit to determine a beamforming matrix corresponding to the user device based on a plurality of beamforming vectors corresponding to the user device, said wireless communication unit is to determine the plurality of beamforming vectors corresponding to the user device based on a Single Value Decomposition of an interference matrix corresponding to the user device, the interference matrix including a plurality of eigenvector matrices corresponding to other user devices of said plurality of user devices, an eigenvector matrix corresponding to a respective other user device including a plurality of eigenvectors represented by the channel feedback transmission from the other user device.

16. The wireless communication system of claim 15, wherein the channel feedback transmission includes a codebook index representing a plurality of predefined vectors corresponding to the plurality of eigenvectors of the MIMO channel matrix.

17. A method including:
at a wireless communication device, receiving a plurality of channel feedback transmissions from a plurality of user devices, respectively, wherein a channel feedback transmission from a user device of the user devices includes partial information relating to a multi-input-multi-output (MIMO) channel matrix between the wireless communication device and the user device, the channel feedback transmission from the user device representing a plurality of dominant eigenvectors corresponding to a respective plurality of dominant eigenvalues of the MIMO channel matrix;
determining a MIMO beamforming scheme based on the plurality of channel feedback transmissions by determining said MIMO beamforming scheme based on a plurality of beamforming matrices corresponding to said plurality of user devices, a beamforming matrix corresponding to the user device being based on a plurality of beamforming vectors, which are based on an interference matrix corresponding to the user device, the interference matrix including a plurality of eigenvector matrices corresponding to other user devices of said plurality of user devices, an eigenvector matrix corresponding to a respective other user device including a plurality of eigenvectors represented by the channel feedback transmission from the other user device; and
transmitting a multi-user MIMO transmission to the plurality of user devices according to the MIMO beamforming scheme, the multi-user MIMO transmission including two or more transmission streams directed to the user device.

18. The method of claim 17, wherein the channel feedback transmission includes a codebook index representing a plurality of predefined vectors approximating the plurality of eigenvectors of the MIMO channel matrix.

19. The method of claim 17, wherein a number of the plurality of eigenvectors represented by the channel feedback transmission from the user device is equal to a number of the transmission streams directed to the user device, and wherein a number of said plurality of beamforming vectors is equal to the number of the transmission streams directed to the user device.

20. The method of claim 17, wherein the channel feedback transmission from the user device represents a channel quality indicator corresponding to a quality of a channel between the wireless communication device and the user device, wherein determining said MIMO beamforming scheme comprises determining a projected interference matrix based on the channel quality indicator and the interference matrix corresponding to the user device, and determining the plurality of beamforming vectors corresponding to the user device based on a Single Value Decomposition of the projected interference matrix.

21. The method of claim 20, wherein the channel quality indicator represents at least one parameter selected from the group consisting of a signal-to-noise-ratio, a signal-to-noise-interference ratio, and a modulation and coding scheme.

22. A method including:
at a wireless communication device, receiving a plurality of channel feedback transmissions from a plurality of user devices, respectively, wherein a channel feedback transmission from a user device of the user devices includes partial information relating to a multi-input-multi-output (MIMO) channel matrix between the wireless communication device and the user device, the channel feedback transmission from the user device representing a plurality of eigenvectors corresponding to the MIMO channel matrix;
determining a MIMO beamforming scheme based on the plurality of channel feedback transmissions by determining said MIMO beamforming scheme based on a plurality of beamforming matrices corresponding to said plurality of user devices, a beamforming matrix corresponding to the user device being based on a plurality of beamforming vectors corresponding to the user device, the plurality of beamforming vectors corresponding to the user device being based on a Single Value Decomposition of an interference matrix corresponding to the user device, the interference matrix including a plurality of eigenvector matrices corresponding to other user devices of said plurality of user devices, an eigenvector matrix corresponding to a respective other user device including a plurality of eigenvectors represented by the channel feedback transmission from the other user device; and
transmitting a multi-user MIMO transmission to the plurality of user devices according to the MIMO beamforming scheme, the multi-user MIMO transmission including two or more transmission streams directed to the user device.

23. The method of claim 22, wherein the channel feedback transmission includes a codebook index representing a plurality of predefined vectors approximating the plurality of eigenvectors of the MIMO channel matrix.

24. A wireless communication device including:
a wireless communication unit including a transmitter and a receiver, the transmitter to transmit a channel feedback transmission to a wireless communication station, wherein the channel feedback transmission represents a plurality of dominant eigenvectors corresponding to a respective plurality of dominant eigenvalues of a multi-input-multi-output (MIMO) channel matrix between the wireless communication unit and the wireless communication station,
wherein the receiver is to receive from the wireless communication station a plurality of transmission streams of a multi-user transmission according to a MIMO beamforming scheme, wherein the MIMO beamforming scheme is based on the channel feedback transmission, wherein a number of the plurality of dominant eigenvectors represented by the channel feedback transmission is equal to a number of the plurality of transmission streams, and wherein the MIMO beamforming scheme is based on a beamforming matrix including a plurality of beamforming vectors, which are based on an eigenvector matrix including said plurality of dominant eigenvectors.

25. The wireless communication device of claim 24, wherein the channel feedback transmission includes a codebook index representing a plurality of predefined vectors approximating the plurality of dominant eigenvectors of the MIMO channel matrix.

26. The wireless communication device of claim 24, wherein the channel feedback transmission represents a channel quality indicator corresponding to a quality of a channel between the wireless communication unit and the wireless communication station, and wherein the beamforming matrix is based on said channel quality indicator.

* * * * *